US012771899B2

(12) United States Patent
Guan et al.

(10) Patent No.: US 12,771,899 B2
(45) Date of Patent: Oct. 20, 2026

(54) EVENT LIVE-STREAMING METHOD, APPARATUS AND DEVICE AND STORAGE MEDIUM

(71) Applicant: Beijing Zitiao Network Technology Co., Ltd., Beijing (CN)

(72) Inventors: Sainan Guan, Beijing (CN); Siyuan Ren, Beijing (CN); Zhen Li, Beijing (CN); Changjian Wei, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/869,258

(22) PCT Filed: Oct. 31, 2023

(86) PCT No.: PCT/CN2023/128770
§ 371 (c)(1),
(2) Date: Nov. 25, 2024

(87) PCT Pub. No.: WO2024/099195
PCT Pub. Date: May 16, 2024

(65) Prior Publication Data

US 2025/0310595 A1 Oct. 2, 2025

(30) Foreign Application Priority Data

Nov. 7, 2022 (CN) ......................... 202211387544.9

(51) Int. Cl.
*H04N 21/43* (2011.01)
*H04N 21/2187* (2011.01)
(Continued)

(52) U.S. Cl.
CPC ..... *H04N 21/4316* (2013.01); *H04N 21/2187* (2013.01); *H04N 21/4722* (2013.01)

(58) Field of Classification Search
None
See application file for complete search history.

(56) References Cited

U.S. PATENT DOCUMENTS

2019/0124383 A1 4/2019 Ng et al.
2019/0246146 A1 8/2019 Bustamante et al.
(Continued)

FOREIGN PATENT DOCUMENTS

CN 107360442 A 11/2017
CN 304705286 S 6/2018
(Continued)

OTHER PUBLICATIONS

International Patent Application No. PCT/CN2023/128770; Int'l Search Report; dated Feb. 2, 2024; 3 pages.
(Continued)

*Primary Examiner* — Samira Monshi
(74) *Attorney, Agent, or Firm* — BakerHostetler

(57) ABSTRACT

A method for live streaming an event is provided. The method includes: displaying, based on a first live streaming room, a livestreaming image for a target event in a livestreaming window on an event livestreaming room page, wherein the target event has at least one associated livestreaming room which is used to commentate on the target event; switching from the first livestreaming room to a target associated livestreaming room in response to a preset trigger operation for the target associated livestreaming room among the at least one associated livestreaming room, and displaying the livestreaming image for the target event based on the target associated livestreaming room; and displaying the livestreaming image of the target associated livestreaming room in a preset window on the event livestreaming room page.

17 Claims, 6 Drawing Sheets

(51) Int. Cl.
*H04N 21/431* (2011.01)
*H04N 21/4722* (2011.01)

(56) References Cited

U.S. PATENT DOCUMENTS

| | | | | |
|---|---|---|---|---|
| 2019/0262705 | A1 | 8/2019 | Trombetta et al. | |
| 2020/0351564 | A1 | 11/2020 | Zhang et al. | |
| 2023/0412853 | A1* | 12/2023 | Cai | H04N 7/15 |

FOREIGN PATENT DOCUMENTS

| | | | |
|---|---|---|---|
| CN | 112995687 | A | 6/2021 |
| CN | 113364998 | A | 9/2021 |
| CN | 113877213 | A | 1/2022 |
| CN | 114051170 | A | 2/2022 |
| CN | 114125483 | A | 3/2022 |
| CN | 114189696 | A | 3/2022 |
| CN | 114501103 | A | 5/2022 |
| CN | 115914662 | A | 4/2023 |
| JP | 2021-513305 | A | 5/2021 |
| JP | 2021-516087 | A | 7/2021 |
| JP | 2021-166847 | A | 10/2021 |
| JP | 2022-066944 | A | 5/2022 |
| JP | 2022-155136 | A | 10/2022 |

OTHER PUBLICATIONS

First Office Action for Chinese Application No. 202211387544.9, mailed Mar. 18, 2025, 14 pages.

Japan Patent Application No. 2024-572062; Notice of Reasons for Refusal; dated Dec. 2, 2025; 6 pages.

Japan Patent Application No. 2024-572062; Notice of Reasons for Refusal; dated Jun. 2, 2026; 8 pages.

V. Landino; "Watchalongs: Sports and the new generation of consumers are at a crossroads"; https://hashtagpaid.com/banknotes/watchalongs-sports-and-the-new-generation-of-consumers-are-at-a-crossroads; Banknotes; Jun. 2022; accessed Aug. 18, 2026; 12 pages.

* cited by examiner

EVENT LIVE-STREAMING METHOD, APPARATUS AND DEVICE AND STORAGE MEDIUM

CROSS-REFERENCE TO RELATED APPLICATION(S)

This application is a national stage application filed under 35 U.S.C. 371 based on International Patent Application No. PCT/CN2023/128770, filed Oct. 31, 2023, which claims priority to Chinese Patent Application No. 202211387544.9, entitled "EVENT LIVE-STREAMING METHOD, APPARATUS, AND DEVICE AND STORAGE MEDIUM", filed with the China National Intellectual Property Administration on Nov. 7, 2022, which is incorporated by reference in its entirety.

FIELD

The present disclosure relates to the field of data processing, and in particular, to an event live-streaming method, apparatus, and device and a storage medium.

BACKGROUND

With the rise of livestreaming platforms, more and more people are watching various livestreaming events through the livestreaming platforms.

Currently, the way for displaying the livestreaming events is relatively monotonous, which may no longer satisfy diverse requirements of people for the livestreaming events. Therefore, how to enrich the ways for displaying the livestreaming events to enhance user experience is a technical problem that urgently needs to be solved.

SUMMARY

In order to solve the above technical problems, embodiments of the present disclosure provide a method for live streaming an event.

In a first aspect, the present disclosure provides a method for live streaming an event, including:

displaying, based on a first live streaming room, a livestreaming image for a target event in a livestreaming window on an event livestreaming room page wherein the target event has at least one associated livestreaming room which is used to commentate on the target event;

switching from the first livestreaming room to a target associated livestreaming room in response to a preset trigger operation for the target associated livestreaming room among the at least one associated livestreaming room, and displaying the livestreaming image for the target event based on the target associated livestreaming room; and displaying a livestreaming image of the target associated livestreaming room in a preset window on the event livestreaming room page.

In an optional implementation, before switching from the first livestreaming room to a target associated livestreaming room in response to a preset trigger operation for the target associated livestreaming room among the at least one associated livestreaming room, the method further includes:

displaying a livestreaming room entrance respectively corresponding to the at least one associated livestreaming room on the event livestreaming room page; and correspondingly, the switching from the first livestreaming room to the target associated livestreaming room in response to a preset trigger operation for a target associated livestreaming room among the at least one associated livestreaming room, includes:

in response to a preset trigger operation for a target livestreaming room entrance among the livestreaming room entrance respectively corresponding to the at least one associated livestreaming room, switching from the first livestreaming room to a target associated livestreaming room corresponding to the target livestreaming room entrance.

In an optional implementation, displaying the livestreaming image of the target associated livestreaming room in a preset window on the event livestreaming room page includes:

displaying the livestreaming image of the target associated livestreaming room in a preset floating window on the event livestreaming room page.

In an optional implementation, the target event includes a target competition, and the method further includes:

displaying a first preset type of competition information corresponding to the target competition on the event livestreaming room page according to a first page display layout, wherein the first page display layout is used to divide the event livestreaming room page into a plurality of display areas, and wherein different display areas are used to display different types, belonging to the first preset type, of competition information.

In an optional implementation, the competition information corresponding to the target competition includes lineup information of the target competition, and the method further includes:

displaying the lineup information of the target competition in a first display area of the event livestreaming room page, wherein the lineup information includes player identifier information on players a team; and in response to a preset trigger operation for target player identifier information in the lineup information, displaying a player information card corresponding to the target player identifier information in the form of a floating panel.

In an optional implementation, before displaying competition information corresponding to the target competition on the event livestreaming room page according to a first page display layout, the method further includes:

displaying a second preset type of competition information corresponding to the target competition on the event livestreaming room page according to a second page display layout, when it is detected that a period from a current time to the start time of the target competition is greater than a preset duration, wherein the second page display layout is used to divide the event livestreaming room page into a plurality of display areas, and wherein different display areas are used to display different types, belonging to the second preset type, of competition information; and correspondingly, displaying a first preset type of competition information corresponding to the target competition on the event livestreaming room page according to a first page display layout, includes:

switching the second page display layout to the first page display layout when it is detected that a period from a current time to the start time of the target competition is not greater than the preset duration, and displaying the first preset type of competition information corresponding to the target competition according to the first page display layout.

In an optional implementation, the method further includes:

switching from the first page display layout to a third page display layout when it is detected that the target competition is ended, and displaying a third preset type of competition information corresponding to the target competition according to the third page display layout, wherein the third page display layout is used to divide the event livestreaming room page into a plurality of display areas, and the different display areas are used to display different types, belonging to the third preset type, of competition information.

In a second aspect, the present disclosure provides an event live-streaming apparatus. The apparatus includes:

a first display module, configured to display, based on a first live streaming room, a livestreaming image for a target event in a livestreaming window on an event livestreaming room page, where the target event has at least one associated livestreaming room which is used to commentate on the target event;

a first switching module, configured to switch from the first livestreaming room to a target associated livestreaming room in response to a preset trigger operation for the target associated livestreaming room among the at least one associated livestreaming room, and display the livestreaming image for the target event based on the target associated livestreaming room; and a second display module, configured to display the livestreaming image of the target associated livestreaming room in a preset window on the event livestreaming room page.

In a third aspect, the present disclosure provides a computer-readable storage medium storing instructions. The instructions, when running on a terminal device, cause the terminal device to implement the above method.

In a fourth aspect, the present disclosure provides an event live-streaming device, including a memory, a processor, and a computer program stored on the memory and runs on the processor. The computer program, when executed by the processor, implements the above method.

In a fifth aspect, the present disclosure provides a computer program product. The computer program product includes computer programs/instructions. The computer programs/instructions, when executed by a processor, implement the above method.

Compared with the prior art, the technical solutions provided in the embodiments of the present disclosure at least have the following advantages:

according to the method of live streaming an event provided in this embodiment of the present disclosure, firstly, in the livestreaming window on the event livestreaming room page, the livestreaming image for the target event is displayed based on the first livestreaming room, wherein the target event has the at least one associated livestreaming room which is used to commentate on the target event; in response to the preset trigger operation for the target associated livestreaming room among the at least one associated livestreaming room, the first livestreaming room is switched to the target associated livestreaming room; the livestreaming image for the target event is displayed based on the target associated livestreaming room and meanwhile the livestreaming image of the target associated livestreaming room is displayed in the preset window on the event livestreaming room page. Accordingly, through the ways for switching the livestreaming room on the event livestreaming room page, embodiments of the present disclosure can achieve same-screen display of the livestreaming image and a commentary image for the target event, which enriches the ways for displaying the livestreaming image for the target event and enhances user experience.

BRIEF DESCRIPTION OF THE DRAWINGS

The accompanying drawings herein are incorporated into the specification to form a part of the specification, illustrate embodiments conforming to the present disclosure, and are used to explain the principle of the present disclosure together with the specification.

In order to describe the technical solutions in the embodiments of the present disclosure or in the prior art more clearly, the accompanying drawings required to be used in descriptions of the embodiments or the prior art will be briefly introduced below, and it is apparent that those of ordinary skill in the art may also obtain other accompanying drawings according to these accompanying drawings without creative work.

DETAILED DESCRIPTION OF EMBODIMENTS

To have a clearer understanding of the above objectives, features, and advantages of the present disclosure, the solution of the present disclosure is further described below. It should be noted that features of the embodiments and implementations in the present disclosure can be mutually combined without conflicts.

Many specific details are elaborated in the following description to facilitate a full understanding of the present disclosure, but the present disclosure may also be implemented in methods different from those described herein. Apparently, the embodiments in the specification are only a part rather all of the embodiments of the present disclosure.

To enrich ways for displaying livestreaming events and enhance user experience, an embodiment of the present disclosure provides a method for live streaming an event. Specifically, in a livestreaming window on an event livestreaming room page, a livestreaming image for a target event is displayed based on a first livestreaming room, wherein the target event has at least one associated livestreaming room which is used to commentate on the target event; in response to a preset trigger operation for a target associated livestreaming room among the at least one associated livestreaming room, the first livestreaming room is switched to the target associated livestreaming room; the livestreaming image for the target event is displayed based on the target associated livestreaming room; and meanwhile the livestreaming image of the target associated livestreaming room is displayed in a preset window on the event livestreaming room page.

It is apparent that through the method for switching the livestreaming room on the event livestreaming room page, embodiments of the present disclosure can achieve a same-screen display of the livestreaming image and a commentary image for the target event, which enriches the ways for displaying the livestreaming image for the target event, and enhances user experience.

Figure 1:
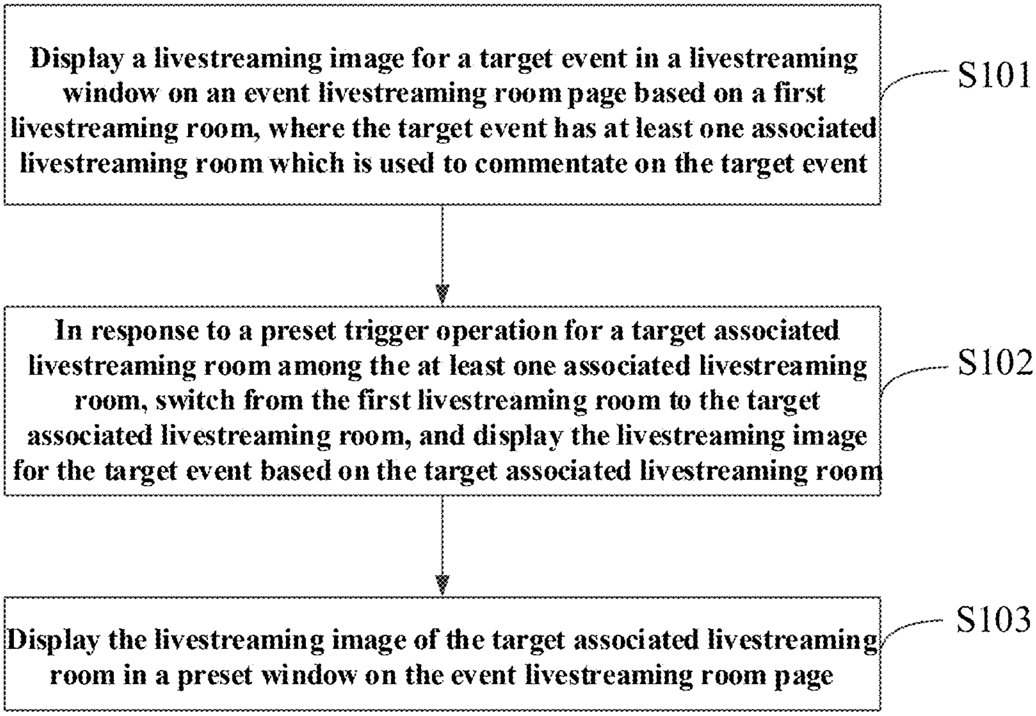
FIG. 1 is a flowchart of a method for live streaming an event according to an embodiment of the present disclosure.

Accordingly, an embodiment of the present disclosure provides a method for live streaming an event. Referring to FIG. 1, FIG. 1 is a flowchart of a method for live streaming an event according to an embodiment of the present disclosure. The method may include:

S101: Display, based on a first live streaming room, a livestreaming image for a target event in a livestreaming window on an event livestreaming room page.

In an embodiment, the target event has at least one associated livestreaming room which is used to commentate on the target event.

The method for live streaming an event provided in the present disclosure is applied to a terminal with a camera function and a display screen, such as a personal computer (PC) terminal, a mobile terminal, and a smart television.

In this embodiment of the present disclosure, the event livestreaming room page may be any event livestreaming room page, such as a sports event livestreaming room page, or a gaming event livestreaming room page, etc. Specifically, the livestreaming window is displayed on the event livestreaming room page, thereby allowing a user to watch a corresponding event livestreaming image through the livestreaming room.

The first livestreaming room may be any livestreaming room that displays a target event livestreaming image.

Figure 2:
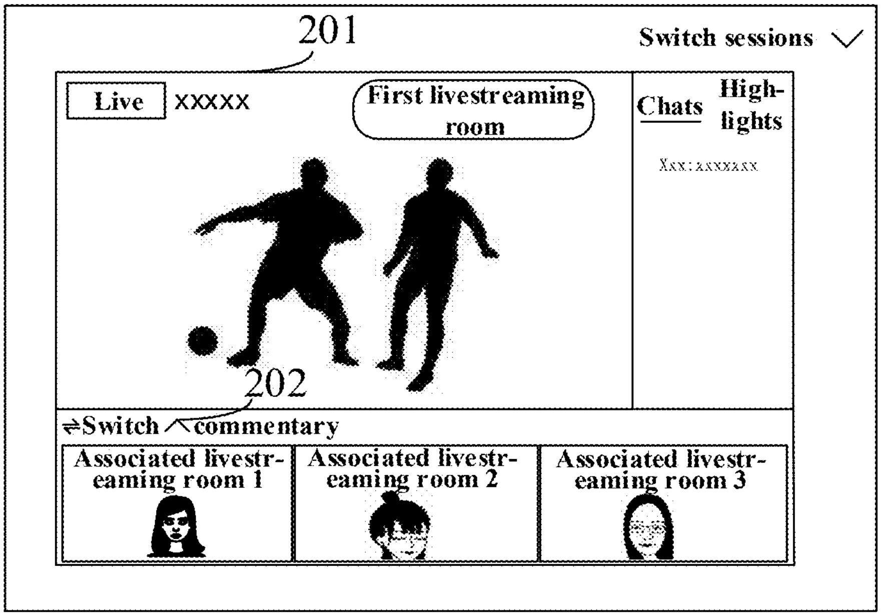
FIG. 2 is a schematic diagram of an event livestreaming room page according to an embodiment of the present disclosure.

Referring to FIG. 2, which is a schematic diagram of an event livestreaming room page according to an embodiment of the present disclosure. As shown in FIG. 2, the event livestreaming room page displays a livestreaming window 201. In the livestreaming window 201, a livestreaming image for a target event is displayed based on a first livestreaming room, and meanwhile a plurality of associated livestreaming rooms (i.e., an associated livestreaming room 1, an associated livestreaming room 2, and an associated livestreaming room 3) are also displayed on the event livestreaming room page and used to commentate on the target event, wherein the plurality of associated livestreaming rooms displayed on the event livestreaming room page are in a display state by default. After the user triggers a hide control 202, the above plurality of associated livestreaming rooms may be hidden.

S102: In response to a preset trigger operation for a target associated livestreaming room among the at least one associated livestreaming room, the first livestreaming room is switched to the target associated livestreaming room, and the livestreaming image for the target event is display based on the target associated livestreaming room.

The target associated livestreaming room may be any associated livestreaming room that corresponds to the target event.

In this embodiment of the present disclosure, if the user wants to watch a commentary of the target event, it may be achieved through the preset trigger operation for the target associated livestreaming room. Specifically, the preset trigger operation for the target associated livestreaming room may include a plurality of methods. The following implementations are examples. This embodiment of the present disclosure does not limit implementations of the preset trigger operation for the target associated livestreaming room.

In an optional implementation, the preset trigger operation for the target associated livestreaming room may be implemented through a trigger operation on a preset associated livestreaming room switching control set on the event livestreaming room page. Specifically, a tap operation is triggered by tapping the preset associated livestreaming room switching control set on the event livestreaming room page, thereby, the first livestreaming room is switched to the target associated livestreaming room.

The preset associated livestreaming room switching control may be set at any position of the event livestreaming room page (e.g., a position under the first livestreaming room), the preset associated livestreaming room switching control may be set to any shape (e.g., square or circle), and so on.

In another optional implementation, the preset trigger operation for the target associated livestreaming room may be implemented by setting livestreaming room entrances respectively corresponding to the associated livestreaming rooms on the event livestreaming room page and implemented based on a preset trigger operation on the livestreaming room entrances. Specifically, for a livestreaming room entrance corresponding to each associated livestreaming room displayed on the event livestreaming room page, in response to the preset trigger operation for a target livestreaming room entrance among the livestreaming room entrances corresponding to the associated livestreaming rooms respectively, the first livestreaming room is switched to the target associated livestreaming room corresponding to the target livestreaming room entrance.

The target livestreaming room entrance may be any livestreaming room entrance. Specifically, the preset trigger operation for the target livestreaming room entrance may be implemented by triggering a tap operation for the target livestreaming room entrance, and embodiment of the present disclosure does not impose any limitation on this.

In this embodiment of the present disclosure, livestreaming room entrances corresponding to the associated livestreaming rooms respectively are set on the event livestreaming room page, wherein the livestreaming room entrances are used to enter the respective associated livestreaming rooms. In the process of displaying the target event livestreaming image, the livestreaming room entrances corresponding to the associated livestreaming rooms respectively are displayed on the event livestreaming room page, such that the user may trigger the livestreaming room entrance to switch to the associated livestreaming room corresponding to the livestreaming room entrance.

In addition, in order not to influence user's viewing of the livestreaming image for the target event when the user watches the commentary on the target event, after switching to the target associated livestreaming room from the first livestreaming room, the target associated livestreaming room continues to display the livestreaming image for the target event displayed by the first livestreaming room before the switching.

In practical applications, the commentary on the target event may also be implemented based on an audio commentary stream. Specifically, a speech stream entrance corresponding to at least one audio commentary stream respectively is displayed on the event livestreaming room page. In response to a preset trigger operation for a target speech stream entrance among the speech stream entrance corresponding to the at least one audio commentary stream respectively, a target audio commentary is played when displaying the livestreaming image for the target event based on the first livestreaming room.

The audio commentary stream may be commentary audio corresponding to the target event. The preset trigger operation for the target speech stream entrance may be implemented by triggering a tap operation for the target speech stream entrance. This embodiment of the present disclosure does not impose any limitation on this.

Specifically, for the speech stream entrance corresponding to each audio commentary stream displayed on the event livestreaming room page, after receiving the preset trigger operation for the target speech stream entrance among the speech stream entrances corresponding to the audio commentary streams respectively, the livestreaming image for the target event is continuously played in the first livestreaming room, and meanwhile the target audio commentary is played without switching the livestreaming room. Thereby, listening to the target audio commentary while watching the livestreaming image for the target event can be achieved, and user experience in watching the livestreaming image for the target event can be enhanced.

S103: Display the livestreaming image of the target associated livestreaming room in a preset window on the event livestreaming room page.

The preset window may be any window on the event livestreaming room page that does not interfere with the user in watching the livestreaming image for the target event.

According to embodiments of the present disclosure, after switching to the target associated livestreaming room from the first livestreaming room, the target associated livestreaming room displays the livestreaming image for the target event, and meanwhile, the livestreaming image of the target associated livestreaming room (namely, an image about the commentary on the target event) is displayed within the preset window on the event livestreaming room page, thereby, allowing the user to watch the commentary on the target event while watching the livestreaming image for the target event, which enriches the ways for displaying the livestreaming image for the target event and enhances user experience.

Figure 3:
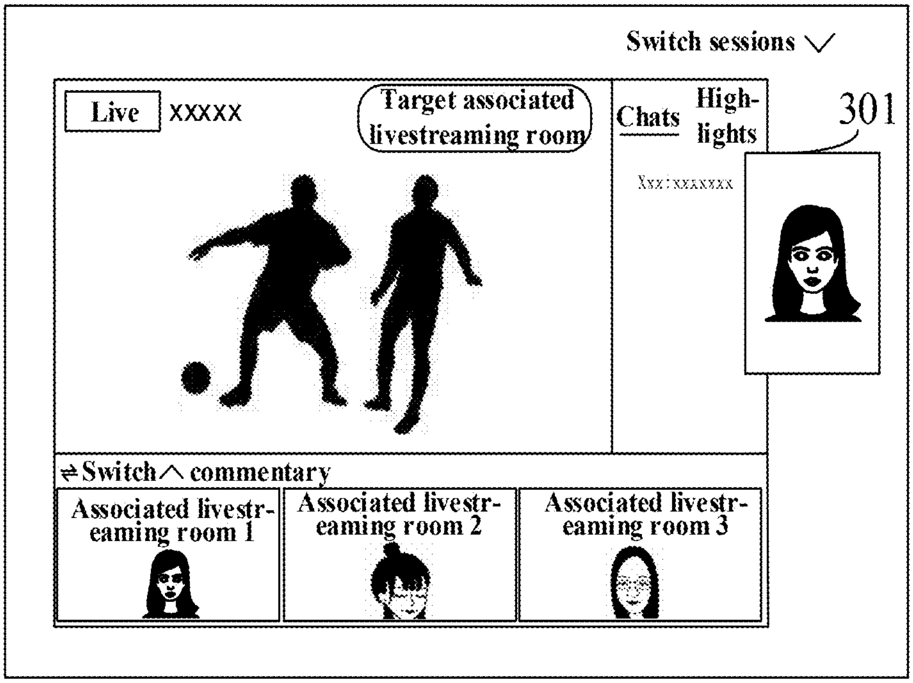
FIG. 3 is a schematic diagram of another event livestreaming room page according to an embodiment of the present disclosure.

For a clearer understanding of the embodiments of the present disclosure, FIG. 3 is shown, which is a schematic diagram of another event livestreaming room page according to this embodiment of the present disclosure. As shown in FIG. 3, after switching to the target associated livestreaming room from the first livestreaming room, the target associated livestreaming room continues to display the target event displayed in the first livestreaming room before the switching, and meanwhile the livestreaming image of the target associated livestreaming room is displayed within a preset window 301.

Additionally, in order not to influence the user's viewing of the livestreaming image for the target event, the preset window may be displayed in a form of a floating window. In an optional implementation, the livestreaming image of the target associated livestreaming room is displayed within a preset floating window on the event livestreaming room page.

The preset floating window refers to a window that is preset and floats on the event livestreaming room page.

In this embodiment of the present disclosure, when the livestreaming image of the target associated livestreaming room is displayed within the preset floating window on the event livestreaming room page, the user may adjust the position of the preset floating window through a way such as dragging, so as not to obscure the livestreaming image for the target event.

In another optional implementation, the preset window may also be displayed in a picture-in-picture form. Specifically, the livestreaming image of the target associated livestreaming room is displayed within a preset picture-in-picture frame on the event livestreaming room page.

It should be noted that the present disclosure does not limit the display form of the preset window.

According to the method for live streaming an event provided in this embodiment of the present disclosure, firstly, in the livestreaming window on the event livestreaming room page, the livestreaming image for the target event is displayed based on the first livestreaming room, wherein the target event has the at least one associated livestreaming room which is used to commentate on the target event; in response to a preset trigger operation for the target associated livestreaming room among the at least one associated livestreaming room, the first livestreaming room is switched to the target associated livestreaming room; the livestreaming image for the target event is displayed based on the target associated livestreaming room and meanwhile the livestreaming image in the target associated livestreaming room is displayed within a preset window on the event livestreaming room page. Accordingly, through the ways for switching the livestreaming room on the event livestreaming room page, embodiments of the present disclosure achieve same-screen display of the livestreaming image and a commentary image for the target event, enriching the ways for displaying the livestreaming image for the target event and enhancing user experience.

In practical applications, when the target event includes a target competition, to enhance the user experience in watching the target competition, the event livestreaming room page may be divided into a plurality of display areas for displaying various types of competition information. Therefore, in an optional implementation, the event livestreaming room page displays a first preset type of competition information corresponding to the target competition according to a first page display layout.

The first page display layout is used to divide the event livestreaming room page into a plurality of display areas, and different display areas are used to display different types, belonging to the first preset type, of competition information.

Specifically, the first page display layout may also be set based on requirements, which is not limited in the present disclosure.

The first preset type of competition information may be preset various types of competition information, such as lineup information of the target competition, match status information of the target competition, data statistics information of the target competition, qualification situation information of the target competition, and prize-winning prediction information of the target competition. The present disclosure does not impose any limitation on the first preset type of competition information.

According to this embodiment of the present disclosure, by displaying various types of competition information corresponding to the target competition in different areas of the same page, the threshold for the user to acquire the various competition information corresponding to the target competition is reduced, and the user experience in watching the target competition is enhanced.

In practical applications, since the various types of competition information corresponding to the target competition may be displayed on the same page, in order to enhance user experience in watching live competitions, the method of live streaming an event provided in this embodiment of the present disclosure is more effective when applied to the PC terminal.

Figure 4:
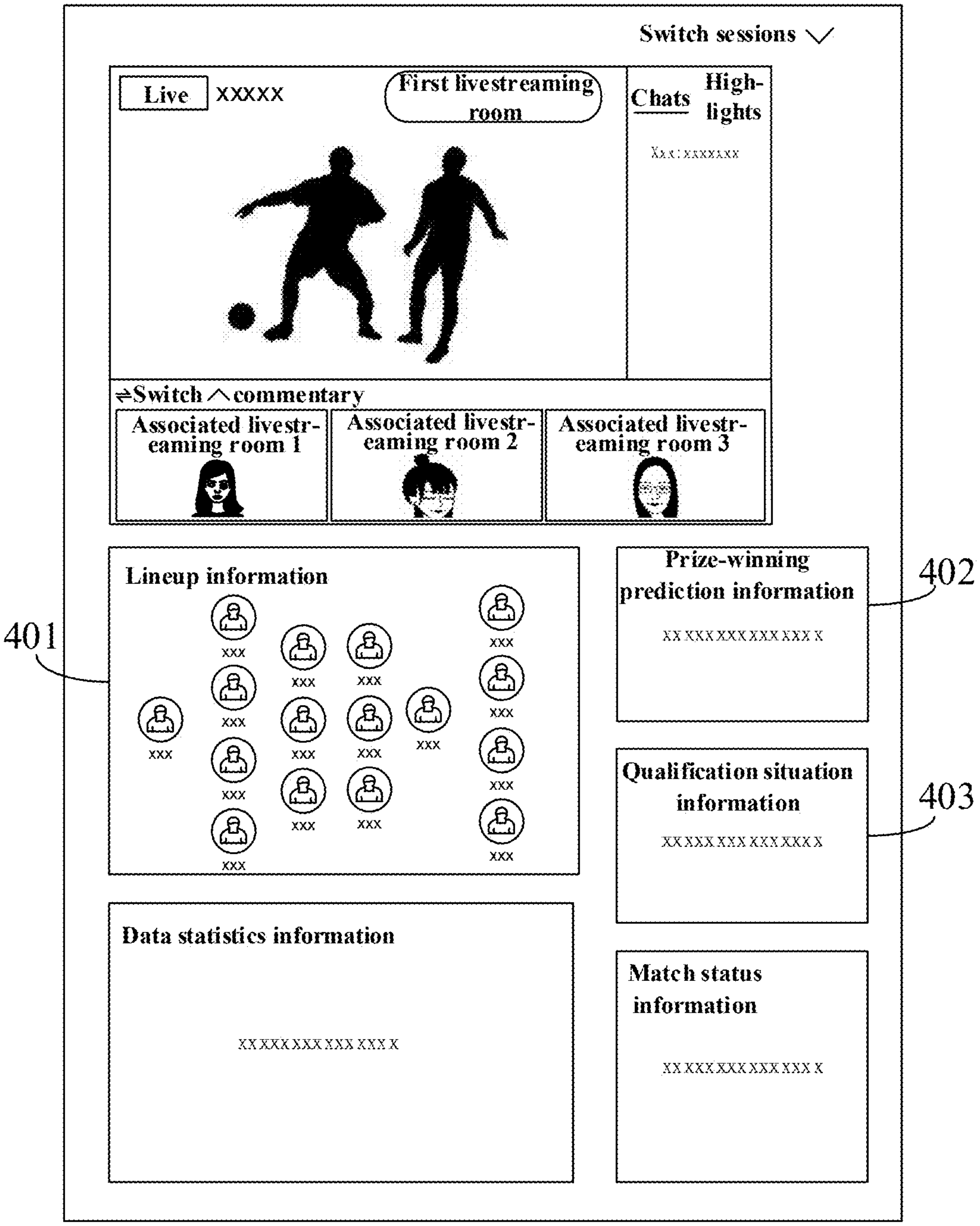
FIG. 4 is a schematic diagram of another event livestreaming room page according to an embodiment of the present disclosure.

For a further understanding of this embodiment of the present disclosure, referring to FIG. 4, which is a schematic diagram of another event livestreaming room page according to an embodiment of the present disclosure. As shown in FIG. 4, an event livestreaming room page is divided into a plurality of display areas according to a first page display layout, such as a display area 401, a display area 402, and a display area 403, etc. The different display areas display different types, belonging to the first type, of competition information. For example, the display area 401 displays lineup information of a target competition, the display area 402 displays prize-winning prediction information of the target competition, and the display area 403 displays qualification situation information of the target competition. By displaying the various types of competition information corresponding to the target competition in the different areas on the same page, user experience in watching the target competition is enhanced.

Based on the above embodiment, to facilitate the user to know target player information of a team participating in the target competition when watching the target competition, in this embodiment of the present disclosure, through a preset trigger operation for target player identifier information in the lineup information of the target competition, a player information card corresponding to the target player identifier information is displayed in a form of a floating panel. Therefore, in an optional implementation, the lineup information of the target competition is displayed in a first display area on the event livestreaming room page, and in response to a preset trigger operation for the target player identifier information in the lineup information, the player information card corresponding to the target player identifier information is displayed in the form of the floating panel.

The lineup information includes player identifier information in the team.

Specifically, the player identifier information may be the avatar, the name, the player number, etc. of a player, which is a unique identifier for the player.

In this embodiment of the present disclosure, the preset trigger operation for the target player identifier information may be implemented by triggering a tap operation for the target player identifier information, or may also be implemented by moving a mouse to a position above the target player identifier information. This embodiment of the present disclosure does not limit the preset trigger operation for the target player identifier information.

Specifically, after receiving the preset trigger operation for the target player identifier information in the lineup information, the player information card corresponding to the target player identifier information is displayed in a form of the floating panel, and correspondingly, the floating panel may be automatically closed within preset time.

The player information card displays relevant information of the player, such as competition data and other information of the player.

Figure 5:
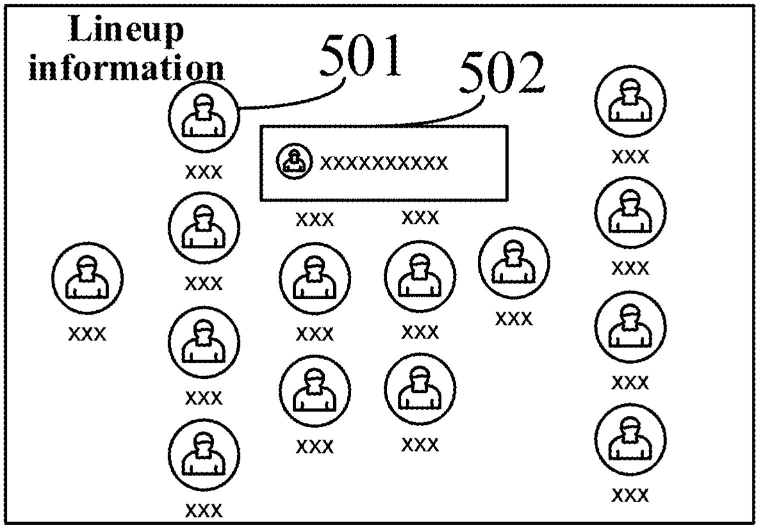
FIG. 5 is a schematic diagram of a first display area on an event livestreaming room page according to an embodiment of the present disclosure.

Further, referring to FIG. 5, which is a schematic diagram of a first display area on an event livestreaming room page according to an embodiment of the present disclosure. As shown in FIG. 5, the first display area displays lineup information of a target competition. The lineup information includes identifier information of players in a team. Specifically, after receiving a preset trigger operation for target player identifier information 501 in the lineup information, a player information card 502 corresponding to the target player identifier information 501 is displayed in a form of a floating panel, and information about the players in the team may be displayed without navigating to another page, thereby facilitating the user to understand the information about the players in the team, and then enhancing user experience.

Based on the above embodiment, if there is a considerable amount of time before the start of the target competition, to facilitate the user to understand relevant competition information of the target competition beforehand, according to this embodiment of the present disclosure, a second preset type of competition information corresponding to the target competition may also be displayed on the event livestreaming room page according to a second page display layout. In an alternative implementation, when it is detected that a period from a current time to a start time of the target competition is greater than a preset duration, the second preset type of competition information corresponding to the target competition is displayed on the event livestreaming room page according to the second page display layout.

The second page display layout is used to divide the event livestreaming room page into a plurality of display areas, and the different display areas are used to display different types, belonging to the second preset type, of competition information.

Specifically, the second page display layout may also be set based on requirements, which is not limited in the present disclosure.

The second preset type of competition information may be preset various types of competition information, such as countdown information, team roster information, qualification situation information, and prize-winning prediction information of the target competition. The present disclosure does not impose any limitation on the second preset type of competition information.

In this embodiment of the present disclosure, when it is detected that a period from the current time to the start time of the target competition is greater than the preset duration, that is, there is a long duration from the current time to the start time of the target competition, the event live-streaming room page may be divided into the plurality of display areas according to the second page display layout to display various competition information of the second preset type, thereby facilitating the user to understand the relevant competition information of the target competition before watching the target competition.

Figure 6:
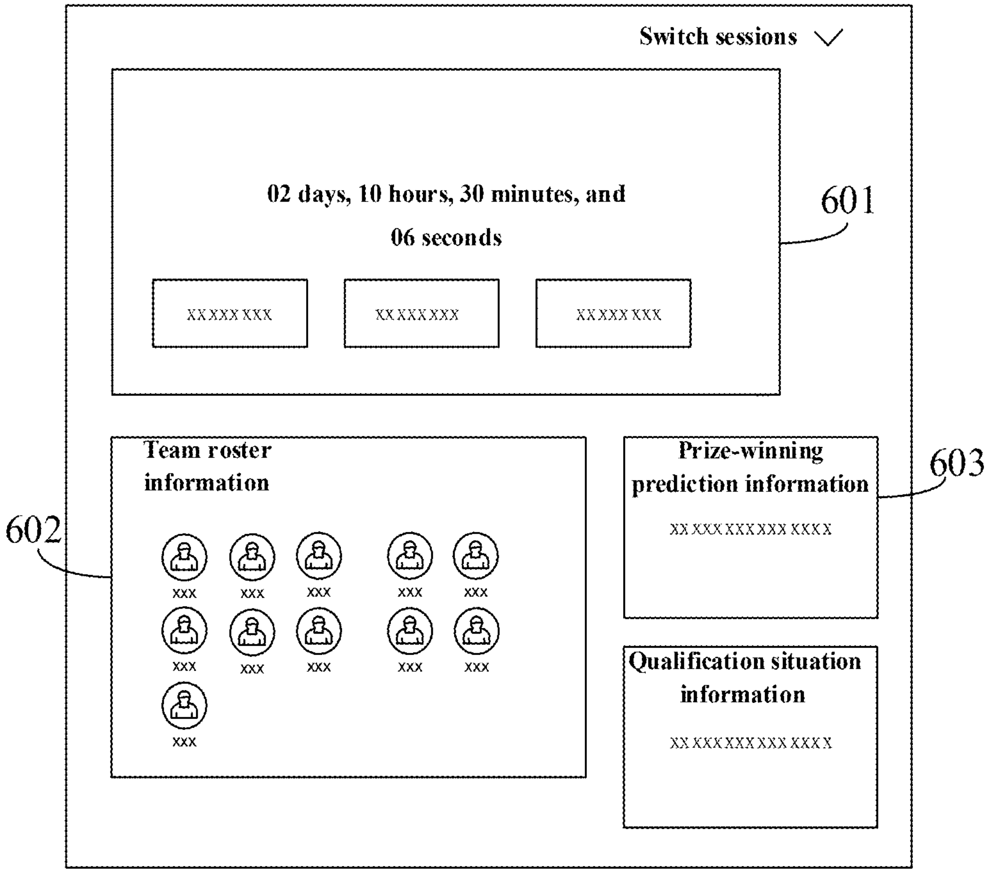
FIG. 6 is a schematic diagram of another event livestreaming room page according to an embodiment of the present disclosure.

Further, referring to FIG. 6, which is a schematic diagram of another event livestreaming room page according to an embodiment of the present disclosure, as shown in FIG. 6, the event livestreaming room page is divided into a plurality of display areas according to a second page display layout, such as a display area 601, a display area 602, and a display area 603. Different display areas display different types, belonging to the second preset type, of competition information. For example, the display area 601 displays countdown information of a target competition, the display area 602 displays team roster information, and the display area 603 displays prize-winning prediction information.

When it is detected that a period from the current time to the start time of the target competition is not greater than the preset duration, the second page display layout is switched to the first page display layout, and the first preset type of competition information corresponding to the target competition is displayed according to the first page display layout.

In practical applications, when it is detected that a period from a current time to a start time of the target competition is not greater than the preset duration, that is, a period from the current time to the start time of the target competition is relatively short, the second page display layout is switched to the first page display layout. Within a livestreaming window corresponding to the first page display layout, a pre-event commentary on the target competition is performed based on the first livestreaming room, thereby allowing the user to know relevant information of the target competition in advance, and enhancing the user experience in watching the target competition.

Based on the above embodiment, if the user needs to review exciting moments of the target competition after watching the target competition, according to this embodiment of the present disclosure, when the target competition is ended, a previous page display layout of the event livestreaming room page may also be switched to a third page display layout, such that the event livestreaming room page may display a third preset type of competition information corresponding to the target competition according to the third page display layout. In an optional implementation, when it is detected that the target competition is ended, the first page display layout is switched to the third page display layout, and the third preset type of competition information of corresponding to the target competition is displayed according to the third page display layout.

The third page display layout is used to divide the event livestreaming room page into a plurality of display areas, and different display areas are used to display different types, belonging to the third preset type, of competition information.

Specifically, the third page display layout may also be set according to requirements, which is not limited in the present disclosure.

The competition information of the third preset type may be preset various types of competition information, such as on-demand information of the target competition, lineup information of the target competition, and match status information of the target competition. The present disclosure does not impose any limitation on the third preset type of competition information.

Figure 7:
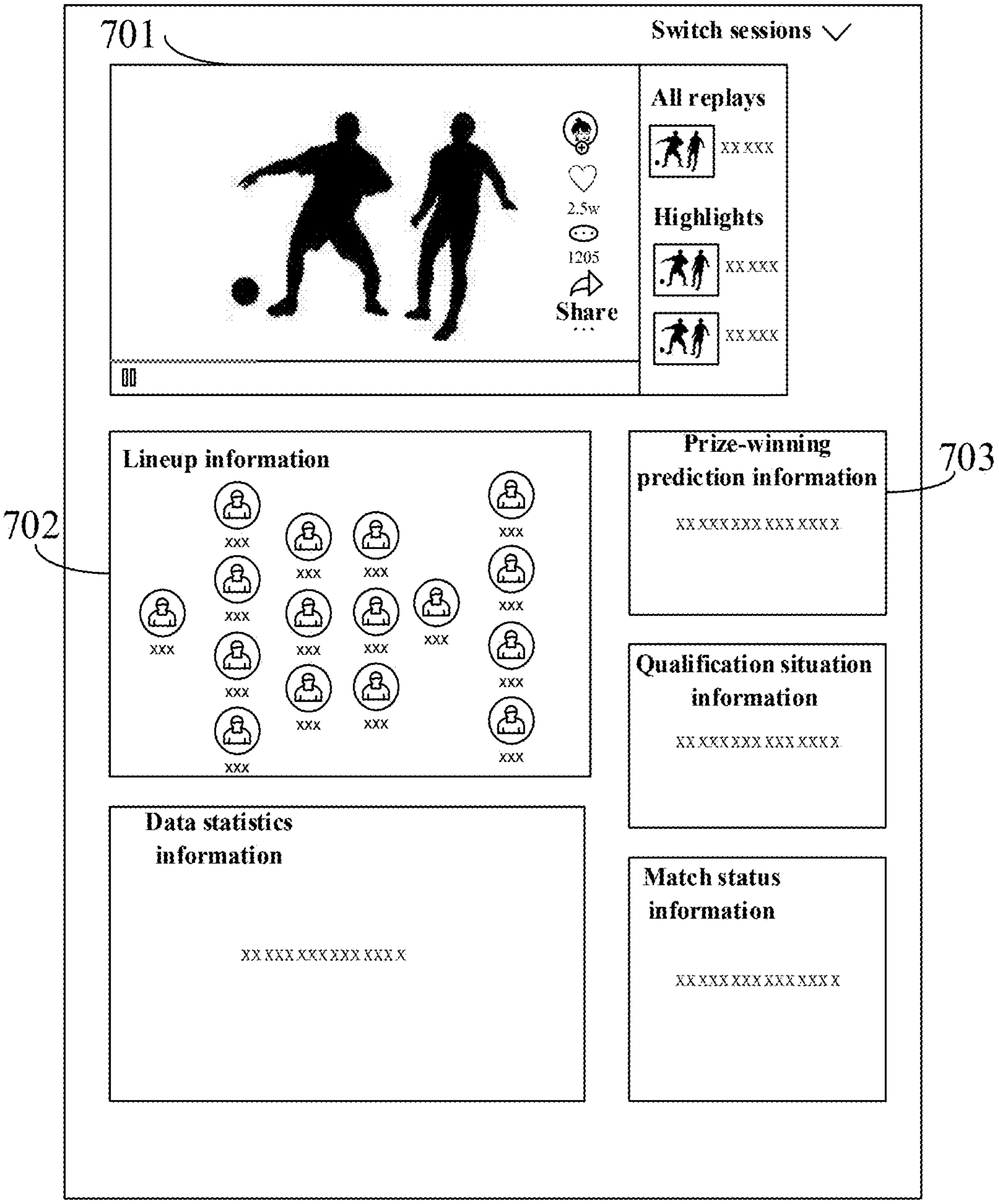
FIG. 7 is a schematic diagram of another event livestreaming room page according to an embodiment of the present disclosure.

Further, referring to FIG. 7, which is a schematic diagram of another event livestreaming room page according to an embodiment of the present disclosure, and as shown in FIG. 7, the event livestreaming room page is divided into a plurality of display areas according to a third page display layout, such as a display area 701, a display area 702, and a display area 703. Different display areas display different types, belonging to the third preset type, of competition information. For example, the display area 701 displays on-demand information of a target competition for the user to review the target competition. The display area 702 displays lineup information of the target competition, and the display area 703 displays prize-winning prediction information of the target competition. Therefore, after the target competition is ended, the user may continue to review the target competition to relive classic moments of the target competition, thereby enhancing post-event watching experience of the user.

Figure 8:
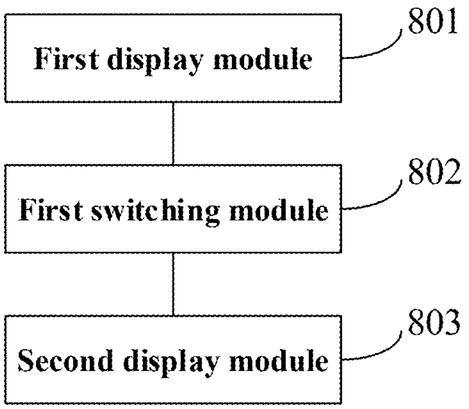
FIG. 8 is a schematic diagram of a structure of an event live-streaming apparatus according to an embodiment of the present disclosure.

Based on the above method embodiments, the present disclosure further provides an apparatus for live streaming an event. Referring to FIG. 8, which is a schematic diagram of a structure of an apparatus for live streaming an event according to an embodiment of the present disclosure, the apparatus includes:

- a first display module 801, configured to display, based on a first live streaming room, a livestreaming image for a target event in a livestreaming window on an event livestreaming room page, wherein the target event has at least one associated livestreaming room which is used to commentate on the target event;
- a first switching module 802, configured to switch from the first livestreaming room to a target associated livestreaming room in response to a preset trigger operation for the target associated livestreaming room among the at least one associated livestreaming room, and display the livestreaming image for the target event based on the target associated livestreaming room; and
- a second display module 803, configured to display the livestreaming image of the target associated livestreaming room in a preset window on the event livestreaming room page.

In an optional implementation, the apparatus further includes:

- a third display module, configured to display a livestreaming room entrance respectively corresponding to the at least one associated livestreaming room on the event livestreaming room page; and
- correspondingly, the first switching module is specifically configured to:
- in response to a preset trigger operation for a target livestreaming room entrance among the livestreaming room entrance respectively corresponding to the at least one associated livestreaming room, switch, from the first livestreaming room to a target associated livestreaming room corresponding to the target livestreaming room entrance.

In an optional implementation, the second display module is specifically configured to:

- display a livestreaming image of the target associated livestreaming room in a preset floating window on the event livestreaming room page.

In an optional implementation, the target event includes a target competition. The apparatus further includes:

- a fourth display module, configured to display a first preset type of competition information corresponding to the target competition on the event livestreaming room page according to a first page display layout, wherein the first page display layout is used to divide the event livestreaming room page into a plurality of display areas, and different display areas are used to display different types, belonging to the first preset type, of competition information.

In an optional implementation, the competition information corresponding to the target competition includes lineup information of the target competition, and the apparatus further includes:

- a fifth display module, configured to display the lineup information of the target competition in a first display area of the event livestreaming room page, wherein the lineup information includes player identifier information on players in a team; and a sixth display module, configured to in response to a preset trigger operation for target player identifier information in the lineup information, display a player information card corresponding to the target player identifier information in a form of a floating panel.

In an optional implementation, the apparatus further includes:

a seventh display module, configured to display a second preset type of competition information corresponding to the target competition on the event livestreaming room page according to a second page display layout, in response to a period from a current time to a start time of the target competition being greater than a preset duration, wherein the second page display layout is used to divide the event livestreaming room page into a plurality of display areas, and different display areas are used to display different types, belonging to the second preset type, of competition information; and correspondingly, the fourth display module is specifically configured to:

switch the second page display layout to the first page display layout in response to a period from the current time to the start time of the target competition being not greater than the preset duration, and display the first preset type of competition information corresponding to the target competition according to the first page display layout.

In an optional implementation, the apparatus further includes:

a second switching module, configured to switch from the first page display layout to a third page display layout in response to the target competition being ended, and display a third preset type of competition information corresponding to the target competition according to the third page display layout, wherein the third page display layout is used to divide the event livestreaming room page into a plurality of display areas, and different display areas are used to display different types, belonging to the third preset type, of competition information.

According to the apparatus for live streaming an event provided in this embodiment of the present disclosure, firstly, in the livestreaming window on the event livestreaming room page, the livestreaming image for the target event is displayed based on the first livestreaming room, wherein the target event has the at least one associated livestreaming room which is used to commentate on the target event; in response to the preset trigger operation for the target associated livestreaming room among the at least one associated livestreaming room, the first livestreaming room is switched to the target associated livestreaming room; the livestreaming image for the target event is displayed based on the target associated livestreaming room, and meanwhile the livestreaming image in the target associated livestreaming room is displayed in the preset window on the event livestreaming room page. Accordingly, through the method for switching the livestreaming room on the event livestreaming room page, embodiments of the present disclosure achieve same-screen display of the livestreaming image and a commentary image for the target event, enriching the methods for displaying the livestreaming image for the target event, and enhancing user experience.

In addition to the above method and apparatus, an embodiment of the present disclosure further provides a computer-readable storage medium. The computer-readable storage medium stores instructions. The instructions, when running on a terminal device, cause the terminal device to implement the method of live streaming an event according to the embodiments of the present disclosure.

An embodiment of the present disclosure further provides a computer program product. The computer program product includes computer programs/instructions. The computer programs/instructions, when executed by a processor, implement the method of live streaming an event according to the embodiments of the present disclosure.

Figure 9:
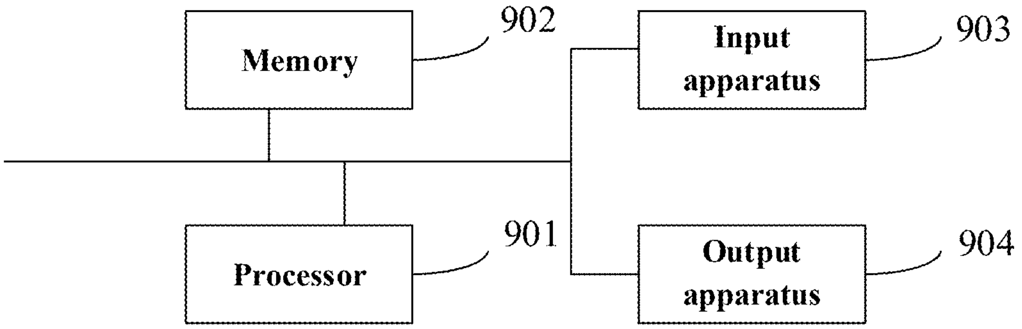
FIG. 9 is a schematic diagram of a structure of an event live-streaming device according to an embodiment of the present disclosure.

In addition, an embodiment of the present disclosure further provides a device for live streaming an event. Referring to FIG. 9, the device may include:

a processor 901, a memory 902, an input apparatus 903, and an output apparatus 904. There may be one or more processors 901 in the device for live streaming an event. One processor in FIG. 9 is used as an example. In some embodiments of the present disclosure, the processor 901, the memory 902, the input apparatus 903, and the output apparatus 904 may be connected through a bus or other methods. Bus connection is used as an example in FIG. 9.

The memory 902 may be configured to store software programs and modules. The processor 901 performs various functional applications and data processing of the device for live streaming an event by running the software programs and the modules stored in the memory 902. The memory 902 may mainly include a program storage area and a data storage area, wherein the program storage area may store an operating system, an application program needed by at least one function, etc. In addition, the memory 902 may include a high-speed random access memory, and may further include a nonvolatile memory, such as at least one magnetic disk storage device, a flash memory, or another volatile solid-state storage device. The input apparatus 903 may be configured to receive input number or character information and generate signal inputs relevant to user settings and function control of the event live-streaming device.

Specifically, in this embodiment, the processor 901 may load executable files corresponding to processes of one or more applications into the memory 902 according to following instructions, and the processor 901 runs the applications stored in the memory 902, thereby implementing various functions of the above event live-streaming device.

It should be noted that herein, relational terms such as "first" and "second" are used only to distinguish one entity or operation from another and do not necessarily require or imply any actual relationship or order between these entities or operations. In addition, the terms "comprise", "include", or any other variations thereof are intended to cover non-exclusive inclusions, and therefore a process, a method, an article, or a device including a series of elements not only includes those elements but also includes other elements not clearly listed, or further includes elements inherent to the process, the method, the article, or the device. In the absence of further restrictions, an element specified by the phrase "including a . . . " does not exclude the existence of other identical elements in the process, the method, the article, or the device that includes the element.

The above contents are merely specific implementations of the present disclosure, such that those skilled in the art can understand or implement the present disclosure. More modifications for these embodiments are apparent to those skilled in the art, and general principles defined herein may be implemented in other embodiments without departing from the spirit or scope of the present disclosure. Therefore, the present disclosure will not be limited by these embodiments described herein but is required to conform to a widest scope consistent with the principles and novel characteristics disclosed herein.

We claim:

1. A method for live streaming an event, comprising:

displaying, based on a first live streaming room, livestreaming images of the event in a livestreaming window on an event livestreaming page, wherein the event has at least one associated livestreaming room which is configured to commentate on the event;

displaying a representation of the at least one associated livestreaming room on the event livestreaming page;

switching from the first livestreaming room to the at least one associated livestreaming room in response to an operation performed on the representation of the at least one associated livestreaming room; and displaying livestreaming images of the at least one associated livestreaming room in a preset window and displaying the livestreaming images of the event based on the at least one associated livestreaming room.

2. The method according to claim 1, wherein the displaying the livestreaming images of the at least one associated livestreaming room in a preset window on the event livestreaming page comprises:

displaying the livestreaming images of the at least one associated livestreaming room in a preset floating window on the event livestreaming page.

3. The method according to claim 1, wherein the event comprises a target competition, and the method further comprises:

displaying a first preset type of competition information corresponding to the target competition on the event livestreaming room-page according to a first page display layout, wherein the first page display layout is used to divide the event livestreaming page into a plurality of display areas, and wherein different display areas are used to display different types, belonging to the first preset type, of competition information.

4. The method according to claim 3, wherein the competition information corresponding to the target competition comprises lineup information of the target competition, and the method further comprises:

displaying the lineup information of the target competition in a first display area of the event livestreaming room page, wherein the lineup information comprises player identifier information on players in a team; and in response to a preset trigger operation for target player identifier information in the lineup information, displaying a player information card corresponding to the target player identifier information in a form of a floating panel.

5. The method according to claim 3, further comprising before displaying competition information corresponding to the target competition on the event livestreaming page according to the first page display layout:

displaying a second preset type of competition information corresponding to the target competition on the event livestreaming page according to a second page display layout, in response to a period from a current time to a start time of the target competition being greater than a preset duration, wherein the second page display layout is used to divide the event livestreaming page into a plurality of display areas, and wherein different display areas are used to display different types, belonging to the second preset type, of competition information; and wherein displaying a first preset type of competition information corresponding to the target competition on the event livestreaming page according to the first page display layout comprises:

switching from the second page display layout to the first page display layout in response to a period from the current time to the start time of the target competition being not greater than the preset duration, and displaying the first preset type of the competition information corresponding to the target competition according to the first page display layout.

6. The method according to claim 3, further comprising:

switching from the first page display layout to a third page display layout, in response to the target competition being ended, and displaying a third preset type of competition information corresponding to the target competition according to the third page display layout, wherein the third page display layout is used to divide the event livestreaming page into a plurality of display areas, and wherein different display areas are used to display different types, belonging to the third preset type, of competition information.

7. A non-transitory computer-readable storage medium having stored thereon instructions, wherein the instructions, when running on a terminal device, cause the terminal device to:

display, based on a first live streaming room, livestreaming images of an event in a livestreaming window on an event livestreaming page, wherein the event has at least one associated livestreaming room which is configured to commentate on the event;

display a representation of the at least one associated livestreaming room on the event livestreaming page;

switch from the first livestreaming room to the at least one associated livestreaming room in response to an operation performed on the representation of the at least one associated livestreaming room; and display livestreaming images of the at least one associated livestreaming room in a preset window and display the livestreaming images of the event based on the at least one associated livestreaming room.

8. A device for live streaming an event, comprising:

a memory;

a processor; and a computer program stored on the memory and running on the processor, wherein the computer program, when executed by the processor, causes the device to:

display, based on a first live streaming room, livestreaming images of the event in a livestreaming window on an event livestreaming page, wherein the event has at least one associated livestreaming room which is configured to commentate on the event;

display a representation of the at least one associated livestreaming room on the event livestreaming page;

switch from the first livestreaming room to the at least one associated livestreaming room in response to an operation performed on the representation of the at least one associated livestreaming room; and display livestreaming images of the at least one associated livestreaming room in a preset window and display the livestreaming images of the event based on the at least one associated livestreaming room.

9. The non-transitory computer-readable storage medium according to claim 7, wherein the instructions causing the terminal device to display the livestreaming images of the at least one associated livestreaming room in a preset window on the event livestreaming page comprises instructions causing the terminal device to:

display the livestreaming images of the at least one associated livestreaming room in a preset floating window on the event livestreaming page.

10. The non-transitory computer-readable storage medium according to claim 7, wherein the event comprises a target competition, and the instructions, when running on the terminal device, further cause the terminal device to:

display a first preset type of competition information corresponding to the target competition on the event livestreaming page according to a first page display layout, wherein the first page display layout is used to divide the event livestreaming page into a plurality of display areas, and wherein different display areas are used to display different types, belonging to the first preset type, of competition information.

11. The non-transitory computer-readable storage medium according to claim 10, wherein the competition information corresponding to the target competition comprises lineup information of the target competition, and the instructions, when running on the terminal device, further cause the terminal device to:

display the lineup information of the target competition in a first display area of the event livestreaming page, wherein the lineup information comprises player identifier information on players in a team; and in response to a preset trigger operation for target player identifier information in the lineup information, display a player information card corresponding to the target player identifier information in a form of a floating panel.

12. The non-transitory computer-readable storage medium according to claim 10, wherein the instructions, when running on the terminal device, further cause the terminal device to:

before displaying competition information corresponding to the target competition on the event livestreaming page according to the first page display layout:

display a second preset type of competition information corresponding to the target competition on the event livestreaming page according to a second page display layout, in response to a period from a current time to a start time of the target competition being greater than a preset duration, wherein the second page display layout is used to divide the event livestreaming page into a plurality of display areas, and wherein different display areas are used to display different types, belonging to the second preset type, of competition information; and wherein displaying a first preset type of competition information corresponding to the target competition on the event livestreaming room-page according to the first page display layout comprises:

switching from the second page display layout to the first page display layout in response to a period from the current time to the start time of the target competition being not greater than the preset duration, and displaying the first preset type of the competition information corresponding to the target competition according to the first page display layout.

13. The non-transitory computer-readable storage medium according to claim 10, wherein the instructions, when running on the terminal device, further cause the terminal device to:

switch from the first page display layout to a third page display layout, in response to the target competition being ended, and display a third preset type of competition information corresponding to the target competition according to the third page display layout, wherein the third page display layout is used to divide the event livestreaming page into a plurality of display areas, and wherein different display areas are used to display different types, belonging to the third preset type, of competition information.

14. The device according to claim 8, wherein computer program causing the device to display the livestreaming images of the target associated livestreaming room in a preset window on the event livestreaming page comprises computer program causing the terminal device to:

display the livestreaming images of the target associated livestreaming room in a preset floating window on the event livestreaming page.

15. The device according to claim 8, wherein the target event comprises a target competition, and wherein computer program, when executed by the processor, further causes the device to:

display a first preset type of competition information corresponding to the target competition on the event livestreaming room page according to a first page display layout, wherein the first page display layout is used to divide the event livestreaming room-page into a plurality of display areas, and wherein different display areas are used to display different types, belonging to the first preset type, of competition information.

16. The device according to claim 15, wherein the event comprises a target competition, wherein the competition information corresponding to the target competition comprises lineup information of the target competition, and wherein computer program, when executed by the processor, further causes the device to:

display the lineup information of the target competition in a first display area of the event livestreaming page, wherein the lineup information comprises player identifier information on players in a team; and in response to a preset trigger operation for target player identifier information in the lineup information, display a player information card corresponding to the target player identifier information in a form of a floating panel.

17. The device according to claim 15, wherein the computer program, when executed by the processor, further causes the device to:

before displaying competition information corresponding to the target competition on the event livestreaming page according to the first page display layout:

display a second preset type of competition information corresponding to the target competition on the event livestreaming page according to a second page display layout, in response to a period from a current time to a start time of the target competition being greater than a preset duration, wherein the second page display layout is used to divide the event livestreaming room-page into a plurality of display areas, and wherein different display areas are used to display different types, belonging to the second preset type, of competition information; and wherein displaying a first preset type of competition information corresponding to the target competition on the event livestreaming page according to the first page display layout comprises:

switching from the second page display layout to the first page display layout in response to a period from the current time to the start time of the target competition being not greater than the preset duration, and displaying the first preset type of the competition information corresponding to the target competition according to the first page display layout.

* * * * *